United States Patent
Tucker

[19]

[11] Patent Number: 6,152,185

[45] Date of Patent: Nov. 28, 2000

[54] HOSE PROTECTOR SYSTEM

[75] Inventor: Clifford Douglas Tucker, Lower Templestowe, Australia

[73] Assignee: National Valve & Engineering Company Pty. Ltd., New South Wales, Australia

[21] Appl. No.: 09/087,968

[22] Filed: Jun. 1, 1998

[30] Foreign Application Priority Data

Jun. 2, 1997 [AU] Australia .................................. PO7110

[51] Int. Cl.$^7$ ................................ F16L 11/00; F16L 3/16
[52] U.S. Cl. .......................... 138/110; 138/112; 138/103; 138/156; 138/158; 248/55
[58] Field of Search ..................... 138/110, 103, 138/178, 156, 118, 121, 158, 163; 248/55

[56] References Cited

U.S. PATENT DOCUMENTS

| | | | |
|---|---|---|---|
| 1,269,924 | 6/1918 | Gathright ............................... | 248/55 X |
| 1,527,300 | 2/1925 | Haerther ............................... | 138/161 X |
| 2,160,009 | 5/1939 | Walker ................................. | 138/158 X |
| 3,014,827 | 12/1961 | Clinchy et al. ......................... | 138/161 |
| 3,374,308 | 3/1968 | Haas ..................................... | 138/113 X |
| 3,707,032 | 12/1972 | Brunelle et al. ..................... | 138/110 X |
| 3,820,172 | 6/1974 | Kane ..................................... | 4/172.15 |
| 4,131,136 | 12/1978 | Sawyer ................................... | 138/110 |
| 4,180,101 | 12/1979 | Wegge ................................... | 138/103 |
| 4,182,378 | 1/1980 | Dieter ..................................... | 138/112 |
| 4,557,510 | 12/1985 | Overmyer ............................. | 138/158 X |
| 4,667,505 | 5/1987 | Sharp ..................................... | 138/161 X |
| 5,054,513 | 10/1991 | Trueb et al. ......................... | 138/158 X |
| 5,542,454 | 8/1996 | Carlson et al. ......................... | 138/110 |

FOREIGN PATENT DOCUMENTS 2352236   12/1977   France .

*Primary Examiner*—Patrick Brinson
*Attorney, Agent, or Firm*—Smith Gambrell & Russell, LLP

[57] ABSTRACT

A hose band for reducing friction between a hose and a surface along which the hose is moved, having a flexible strip which has a series of contact ribs and flexible webs, and a fastening element holding the strip in position about the circumference of the hose. The flexible webs allow the strip to be wrapped around the circumference of the hose, and the ribs hold the hose above the surface along which the hose is moved. The fastening elements can be clips, bands or ties and may engage a circumferential channel on the strip.

17 Claims, 5 Drawing Sheets

HOSE PROTECTOR SYSTEM

BACKGROUND OF THE INVENTION

This invention relates to hose bands and more particularly to hose bands which reduce friction between the hose and the surface along which the hose is moved.

DESCRIPTION OF THE PRIOR ART

In the aircraft fuelling industry, heavy hoses often must be dragged across a tarmac. The contact between the aircraft fuel hose and the tarmac surface can create sufficient frictional resistant so as to place the hose operator at risk of back-strain injury.

Hose bands made of low-friction, anti-static plastic bands or "beads" substantially overcome the problem of frictional resistance by providing point contact at suitably-spaced intervals.

A disadvantage of such prior art hose bands, which bands are moulded in two halves to suit a particular sized (diameter) hose, is that clamping and unclamping of the two halves for maintenance purposes is time-consuming. Furthermore, as wear of the bands is high, the cost of stocking and replacing the specially sized hose bands becomes significant.

SUMMARY OF THE INVENTION

The object of the present invention is to overcome the disadvantages of the prior art.

In accordance with the present invention, there is provided a hose band for reducing friction between a hose and the surface along which the hose is moved, including a flexible strip, said strip having a series of contact ribs and flexible webs allowing said strip to be wrapped about the circumference of said hose such that said contact ribs hold said hose above said surface, and fastening means holding said strip in position about said hose circumference. The invention also relates to a method of reducing the friction between the hose and the surface along which the hose is moved by attaching to the hose one or more of said hose bands.

Preferred fasteners are either clip type which engage with the ribs at either end of the strip to hold it into a sleeve configuration, or are band type which fasten around the circumference of the sleeve. Preferably the fasteners are worm-drive circumferential band fasteners of non-sparking metals such as brass or stainless steel, or cable ties of plastic.

Preferably, the strips are formed as moulded, fluted strips of plastics in the form of thick, "wear" ribs interconnected with flexible webs, thus providing a flexible sleeve having sacrificial "wear" ribs to provide point contact with the wear surface. Preferably, the bands are applied on a length of hose at spacings apart which prevent contact of the hose skin with the wear surface under normal operating conditions.

BRIEF DESCRIPTION OF THE DRAWINGS

Other objects, features and advantages of the invention will be readily apparent from the following description of certain preferred embodiments thereof taken in conjunction with the accompanying drawings, in which.

DETAILED DESCRIPTION OF THE PREFERRED EMBODIMENTS

Figure 1:
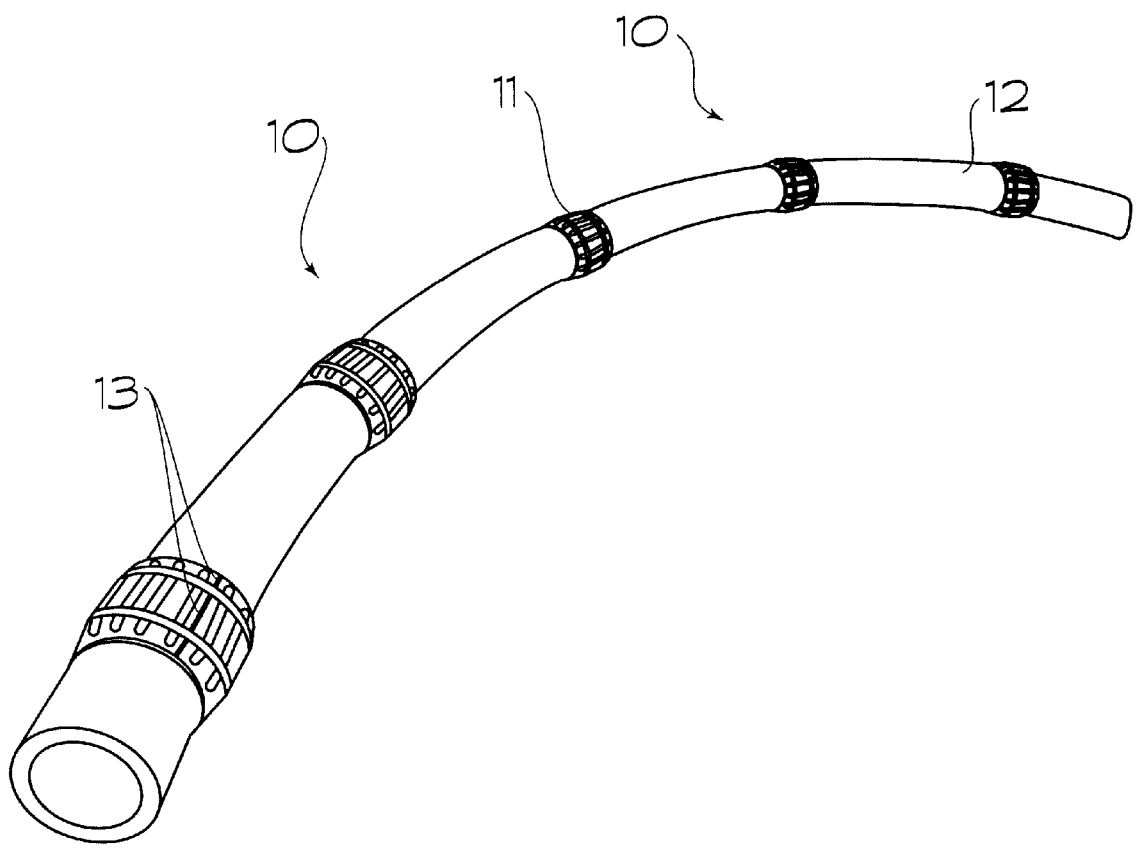
FIG. 1 is a perspective view of a hose fitted with bands according to the invention.

FIG. 1 illustrates hose bands according to the present invention. The hose bands 10 are formed by strips 11 of plastics which are wrapped around a hose 12 of any diameter. The strips 11 are held onto the hose 12 by means of ties 13 and are periodically placed along the length of the hose 12 to give point contact between the surface along which the hose 12 is moved and the hose bands 10.

Figure 2:
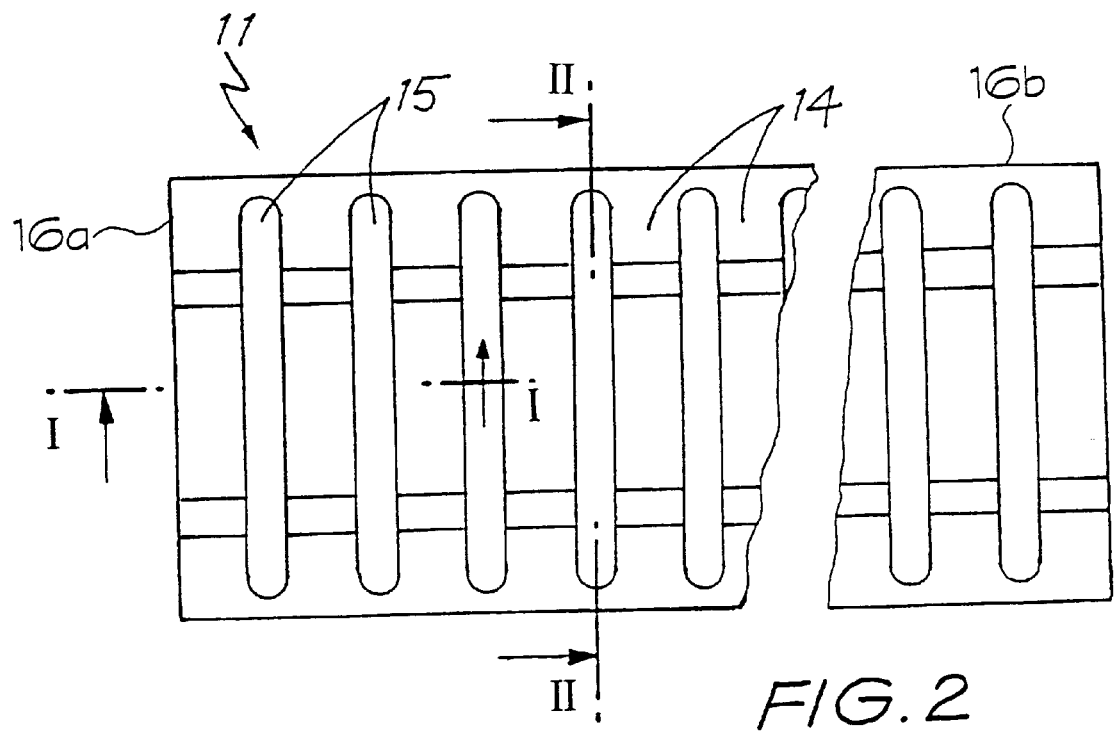
FIG. 2 is a plan view of a strip of plastics material according to a first embodiment of the invention.
Figure 3:
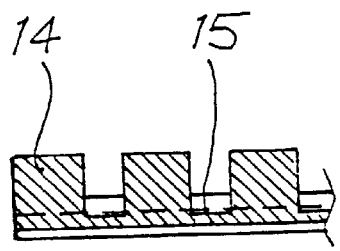
FIG. 3 is a sectional view taken on the line A—A in FIG. 2.
Figure 4:
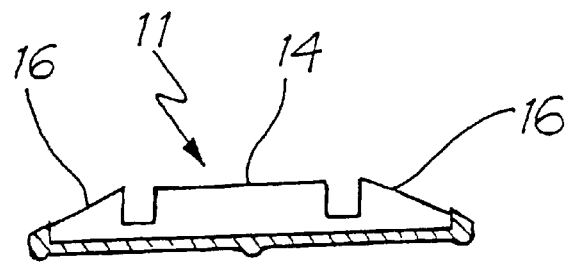
FIG. 4 is a sectional view taken along the line B—B in FIG. 2.

With respect to the above Figure and FIGS. 2, 3 and 4, a hose band 10 is made from a fluted strip 11 of flexible, low friction plastics material consisting of raised ribs 14 separated by thinner web regions 15. The strip is a unitary one piece construction and, as can be seen from FIG. 4, the strip 11 includes tapered regions 16 along each side to allow the band to ride over discontinuities in the surface. The strip has two ends 16a and 16b, which are movable toward each other when the strip is wrapped around the hose, and its length generally corresponds with the circumference of the hose 12. For example, a hose band 10 having seven ribs 14 is suitable to wrap around a hose 12 having a 1-inch diameter; similarly, a hose band having nine ribs is suitable for a 1.5-inch diameter hose; a twelve rib hose band, for a 2-inch diameter hose; a fourteen rib hose band, for a 2.5-inch diameter hose; a sixteen rib hose band, for a 3-inch diameter hose; a twenty-one rib hose band is suitable for a hose having a diameter of 4 inches.

Desirably, the hose bands are moulded as a strip length to suit a 4-inch hose and cut to length for smaller-diameter hoses. Preferable materials for the strip are thermoplastic materials such as high-density polyethylene (HDPE), high-density high molecular-weight polyethylene (HDHMWPE), polypropylene, or polyurethanes.

Figure 5:
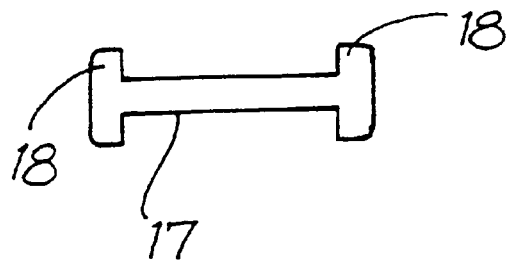
FIG. 5 is an elevation of a clip fastener for use with the first embodiment of the invention.

The arrangement of ribs 14 and webs 15 allows the strip 11 to be flexible so it can be wrapped around the circumference of the hose 12 and then fastened thereabouts by a means of a clip 17, as shown in FIG. 5.

Clip 17 is adapted to span across the seam where the ends of the strip 11 meet and has projections 18 at its ends to engage behind the ribs 14 adjacent the respective ends of the strip 11. The spacing between the projections 18 on the clip 17 will vary depending on the diameter of the hose 12.

Figure 6:
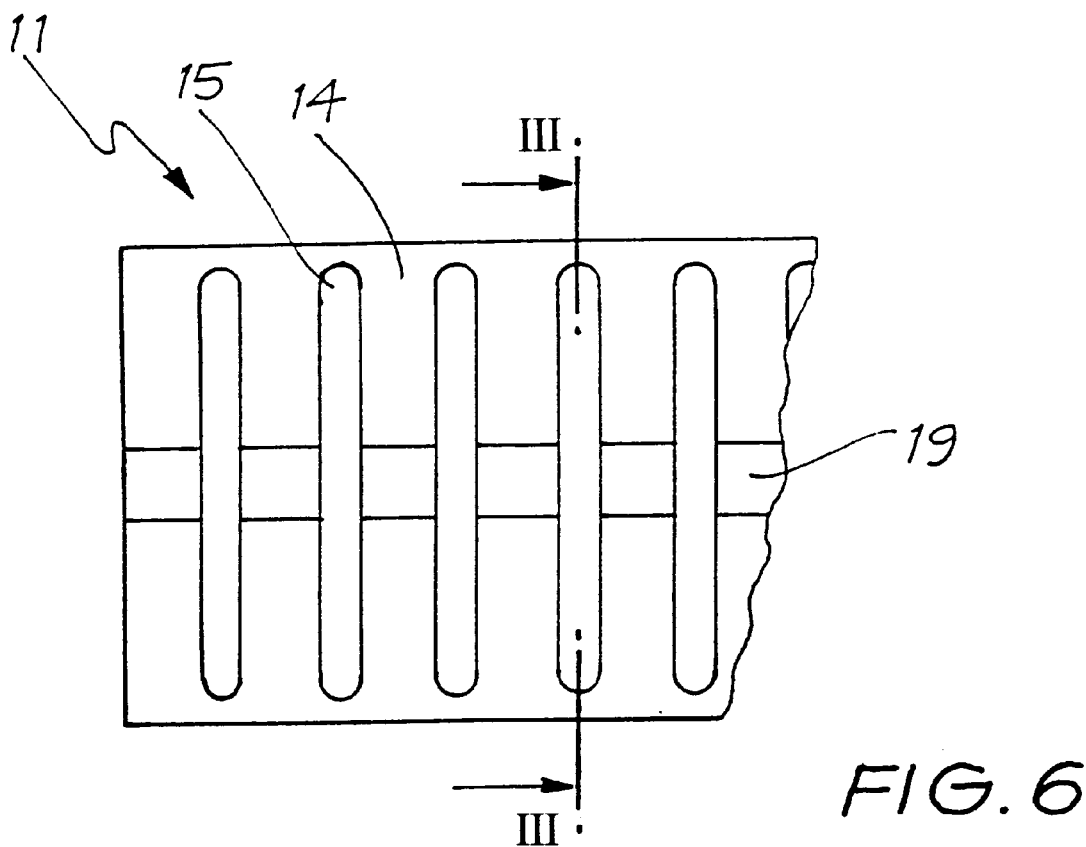
FIG. 6 is a plan view of a strip of plastics material according to a second embodiment of the invention.
Figure 7:
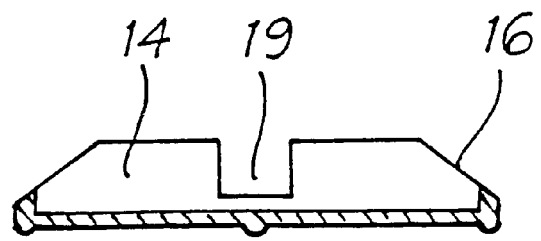
FIG. 7 is a sectional view taken along the line C—C in FIG. 6.
Figure 7A:
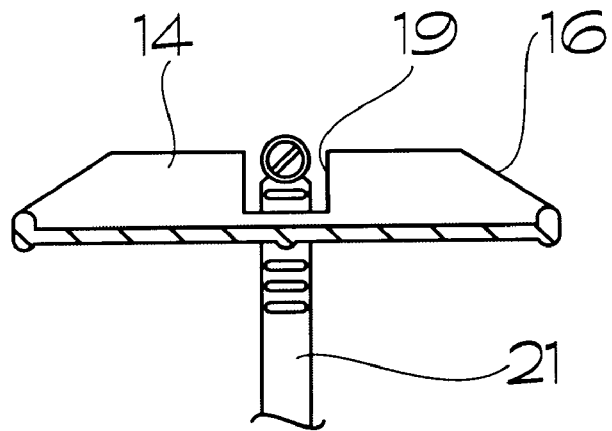
FIG. 7A is a sectional view taken along the line C—C in FIG. 6, also depicting a worm drive clamp.
Figure 7B:
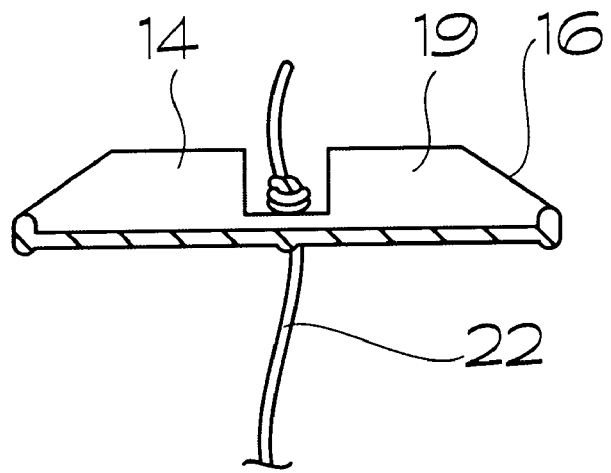
FIG. 7B is a sectional view taken along the line C—C in FIG. 6, also depicting a ratchet-type cable tie.

FIGS. 6, 7A and 7B illustrate a second embodiment of the invention which includes a central, circumferential channel 19 extending along the length of the strip 11 for receiving a band-type fastener such as the worm-drive clamp 21 in FIG. 7A or the ratchet-type cable tie 22 in FIG. 7B.

Figure 8:
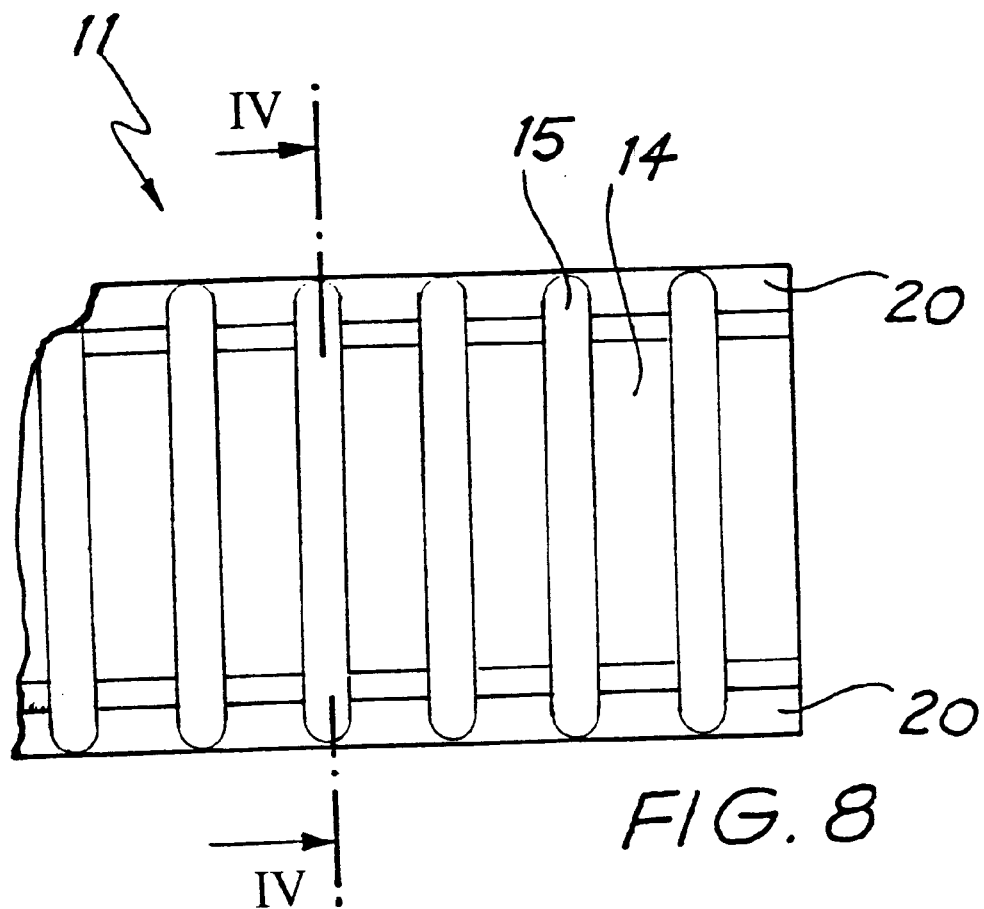
FIG. 8 is a plan view of a strip of plastics material according to a third embodiment of the invention.
Figure 9:
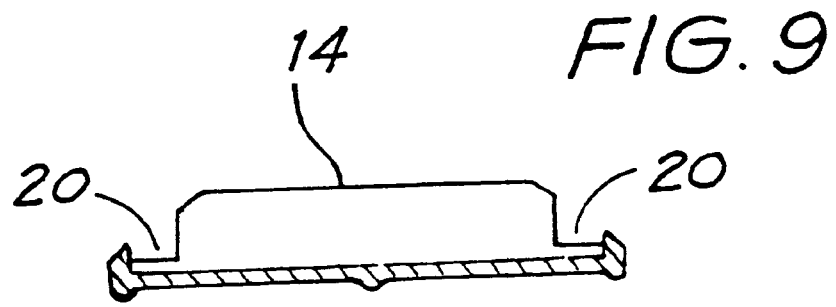
FIG. 9 is a sectional view taken along the line D—D in FIG. 8.

FIGS. 8 and 9 show a third embodiment of the invention in which the band-receiving channels 20 are formed on opposed sides of the strip 11 each receiving a respective band-type fastener 21, 22. The fastener is tightened to form the strip 11 into a sleeve formation about the hose 12.

Maintenance of the hose installation may be achieved simply by cutting the ties 13 holding the worn sections of strip 11, rotating the strip 11 and replacing the ties 13, or replacing the worn sections of strip 11 with new strips 11 and ties 13.

What is claimed is:

1. In combination, a hose, a pavement surface, and a hose band for reducing friction between said hose and said pavement surface along which said hose is moved, said hose band including a flexible strip, said strip having a series of contact ribs and flexible webs allowing said strip to be wrapped about the circumference of said hose such that said contact ribs hold said hose above said surface, said strip being one unitary piece which includes said contact ribs and said flexible webs, and fastening means holding said strip in position about said hose circumference, said hose being supported on and laterally movable on said pavement surface.

2. A combination according to claim 1 wherein said strip has a length substantially corresponding to said hose circumference.

3. A combination according to claim 1 wherein said ribs and said webs are transverse to said strip length.

4. A combination according to claim 1, wherein said fastening means engages formations on said strip.

5. A combination according to claim 4 wherein said fastening means includes at least one clip which spans a seam between the ends of said strip and engages contact ribs adjacent respective ends of said strip.

6. A combination according to claim 5 wherein said clip passes over and is retained behind said contact ribs.

7. A method for reducing friction between the exposed exterior surface of a flexible hose and a pavement surface along which said hose is moved by attaching said exterior surface of said hose one or more hose bands including a flexible strip, said method including the steps of wrapping about the circumference of said exterior surface of said hose a said flexible strip which is one unitary piece which includes a series of contact ribs and flexible webs, applying a fastening means after said wrapping step to hold said strip in position about said hose circumference, and moving said hose on a pavement surface so that said contact ribs will hold said hose above said pavement surface.

8. A method according to claim 7 wherein said hose bands are attached to said hose at intervals along said hose length to maintain said hose above said surface.

9. A hose band according to claim 1, wherein said strip has two ends which are movable toward each other when the strip is wrapped around a hose.

10. A method according to claim 7, wherein the fastening means is applied circumferentially around said wrapped strip.

11. A flexible hose in combination with a hose band for reducing friction between said hose and a pavement surface along which said hose is moved, said hose band including a flexible strip, said strip having a series of contact ribs and flexible webs allowing said strip to be wrapped about the circumference of said hose such that said contact ribs hold said hose above said surface, said strip being one unitary piece which includes said contact ribs and said flexible webs, said strip further having at least one channel extending circumferentially relative to said hose, fastening means holding said strip in position about said hose circumference, said fastening means including at least one fastening band which engages within said circumference channel in said strip to retain the hose band on the hose when said hose is supported on and laterally moved on said pavement surface.

12. The invention according to claim 11, wherein said channel is centrally located in said strip, and fastening means includes a single band which engages within said channel in said strip.

13. The invention according to claim 11, wherein two circumferential channels are adjacent opposite sides of said strip, and said fastening means includes a pair of bands engaging within said circumferential channels in said strip.

14. The invention according to claim 13, wherein the strip has opposed sides which are tapered.

15. The invention according to claim 11, wherein said fastening means is of non-sparking metal.

16. The invention according to claim 11, wherein said fastening means is a worm-drive circumferential clamp.

17. The invention according to claim 11, wherein said fastening means includes at least one ratchet-type cable tie.

* * * * *